United States Patent
Gao et al.

(10) Patent No.: US 10,178,608 B2
(45) Date of Patent: Jan. 8, 2019

(54) METHOD FOR CROSS-SYSTEM NETWORK INFORMATION INTERACTION, AND NETWORK ELEMENT OF TERMINAL SYSTEM NETWORK

(71) Applicant: ZTE CORPORATION, Shenzhen, Guangdong Province (CN)

(72) Inventors: Yin Gao, Shenzhen (CN); Yuanfang Yu, Shenzhen (CN); Feng Xie, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/128,108

(22) PCT Filed: May 26, 2014

(86) PCT No.: PCT/CN2014/078408
§ 371 (c)(1),
(2) Date: Sep. 22, 2016

(87) PCT Pub. No.: WO2015/143770
PCT Pub. Date: Oct. 1, 2015

(65) Prior Publication Data
US 2017/0105170 A1    Apr. 13, 2017

(30) Foreign Application Priority Data
Mar. 26, 2014 (CN) .......................... 2014 1 0116816

(51) Int. Cl.
*H04W 36/00* (2009.01)
*H04W 48/16* (2009.01)
(Continued)

(52) U.S. Cl.
CPC ............. *H04W 48/16* (2013.01); *H04W 8/08* (2013.01); *H04W 48/08* (2013.01)

(58) Field of Classification Search
CPC ....... H04W 4/02; H04W 36/08; H04W 36/12; H04W 36/14; H04W 36/18; H04W 36/30;
(Continued)

(56) References Cited

U.S. PATENT DOCUMENTS

2009/0257353 A1* 10/2009 Song ..................... H04W 24/02
370/241
2012/0236787 A1    9/2012 Salkíntzís
(Continued)

FOREIGN PATENT DOCUMENTS

CN    103327526 A    9/2013
CN    103517350 A    1/2014
(Continued)

*Primary Examiner* — Temica M Beamer
(74) *Attorney, Agent, or Firm* — Ling Wu; Stephen Yang; Ling and Yang Intellectual Property

(57) ABSTRACT

A method for cross-system network information interaction, and a network element of a terminal system network, and the method includes: receiving, by a terminal, a request message for acquiring history information of the terminal, transmitted by a network element of a specified system network, after the terminal successfully establishes a connection with the system network or the terminal transmits a connection establishment success message or reestablishment success message to the system network; transmitting, by the terminal, history record information of the terminal staying in all the system networks, other system networks except the system network, or a specified system network, to a network element of the system network. In the embodiments of the present document, based on a definition of history record information of the terminal in the WLAN system, a cross-
(Continued)

system interaction of the history record information of the terminal in 3GPP-WLAN system may be realized.

11 Claims, 4 Drawing Sheets

(51) Int. Cl.
*H04W 48/08* (2009.01)
*H04W 8/08* (2009.01)

(58) Field of Classification Search
CPC ......... H04W 36/0083; H04W 36/0055; H04W 16/06; H04W 16/32; H04W 52/40; H04W 48/16; H04W 48/18; H04W 76/02; H04W 88/02; H04W 88/06; H04W 92/02
USPC .... 455/436, 437, 438, 439, 442, 443, 422.1, 455/435.2, 456.1, 456.2
See application file for complete search history.

(56) References Cited

U.S. PATENT DOCUMENTS

| | | |
|---|---|---|
| 2013/0208661 A1 | 8/2013 | Nylander et al. |
| 2014/0057625 A1 | 2/2014 | Wager et al. |
| 2015/0312813 A1* | 10/2015 | Xu ...................... H04W 76/027 455/438 |
| 2016/0198384 A1* | 7/2016 | Jung ....................... H04W 8/08 370/328 |
| 2016/0249259 A1* | 8/2016 | Park ...................... H04W 36/00 |
| 2017/0070923 A1* | 3/2017 | Li ..................... H04W 36/0066 |

FOREIGN PATENT DOCUMENTS

| | | |
|---|---|---|
| CN | 103636273 A | 3/2014 |
| EP | 2882207 A1 | 10/2015 |
| WO | 2013049996 A1 | 4/2013 |
| WO | 2014025196 A1 | 2/2014 |

* cited by examiner

METHOD FOR CROSS-SYSTEM NETWORK INFORMATION INTERACTION, AND NETWORK ELEMENT OF TERMINAL SYSTEM NETWORK

TECHNICAL FIELD

The present document relates to the field of communication, and to a method for cross-system network information interaction, and network element of terminal system network in wireless local area network (WLAN) and subsequent evolved systems, such as High Efficient WLAN (HEW for short), and 3GPP interworking system architecture.

BACKGROUND OF THE RELATED ART

Mobile Internet is an industry with fastest development, greatest market potential, and most attractive prospect, and the wireless access is a core technology of the Mobile Internet industry. At present, advanced Multiple Radio Access Technologies (Multi-RAT in short) coexist, and user terminal may access the wireless network in a high speed and enjoy high-quality services. Wherein, typical technologies include wireless wide area network access technology represented by LTE, and wireless local area network technology represented by IEEE 802.11. WLAN is a network in a local region established in the wireless communication technology, the architectural diagram is shown in FIG. 1, compared to LTE (Long Term Evolution), WLAN has a small coverage area, high access rate, and low cost of using.

As a typical representative of 3GPP (3rd Generation Partnership Project) wireless communication family network, LTE network consists of E-UTRAN (Evolved UTRAN (UMTS (Universal Mobile Telecommunications System) Terrestrial Radio Access Network) eNB (Evolved NodeB)) and Evolved Packet Core (EPC in short), and the network is flat. Wherein, an EUTRAN includes a set of eNBs connected with the EPC through an S1 interface, eNBs can be connected with each other through an X2. The S1 and X2 are logical interfaces. One EPC can manage one or more eNBs, one eNodeB also can be controlled by multiple EPCs, and one eNB can manage one or more cells. The LTE-A system is evolved from the LTE system, and the network architecture is the same as that of LTE. LTE is a 4G technology, compared to 3G, LTE has advantages in many aspects: higher data rate, low latency transmission, and guarantee of Quality of Service (QoS). Compared to WLAN, LTE has a larger coverage, and supports high-speed mobile and roaming of a user terminal.

With the continuous evolution of the communication network in future, an inevitable trend is that networks in various system coexist, which includes 2G, 3G, and LTE combination network, and 3GPP-WLAN combination network, etc., and a schematic diagram of the 3GPP-WLAN combination network is shown in FIG. 2. Due to the complementary characteristic between WLAN and 3GPP wireless communication family network, interconnection of 3GPP-WLAN becomes one of the hot topics concerned by equipment manufacturers, system integrators, operators and scientific research institutions.

In case of coexistence of a plurality of access technologies, a fatal problem is how to select a suitable access network, to guarantee a QoS requirement of a user terminal, and to avoid unnecessary Ping-pong handover. At present, in the history record information, a history record cell only includes UTRAN\LTE\GERAN (GSM (Global System for Mobile Communications) EDGE (Enhanced Data Rate for GSM Evolution) Radio Access Network) cell information which is only carried in the handover procedure, and the function of the UTRAN\LTE\GERAN cell information is for RRM (Radio Resource Management) decision to mainly solve the Ping-pong handover. Information of an LTE history record cell includes Global Cell ID, Cell Type (ENUMERATED (very small, small, medium, large, . . . )), Time UE stayed in Cell, and HO Cause Value (reason for UE handover from E-UTRAN to UTRAN). UTRAN history record cell Information history record includes cell ID (PLMN+CID), Cell Type (ENUMERATED (macro, micro, pico, femto, . . . )), and Time UE stayed in Cell. At present, a history record of a terminal in WLAN system is not defined, and because there is no direct cross-system handover procedure between LTE and WIFI, when UE hands over from LTE to WIFI or from WIFI to LTE system, the previous history record information of the UE staying in a system cannot be passed to the target system through a related handover procedure. If a network side acknowledges related information of UE in WLAN system, such as service type, staying time, and traffic and so on, the network side may optimize an ANDSF (Access Network Discovery and Selection Function) policy or RAN (Residential Access Network) policy, to realize an optimization of an air interface configuration parameter, an optimization of a measurement event parameter, and to avoid a Ping-pong handover between the 3GPP system and the WLAN system.

Therefore, the problem required to be solved is how to effectively transmit and use the history record information of the terminal in the WLAN system in a cross-system scenario when a plurality of access technologies coexist, and how to better realize an optimization of the resource management and cross-system handover policy, and to improve the user's satisfaction at the same time.

SUMMARY

The technical problem to be solved by the present document is to provide a method for cross-system network information interaction, and a network element of a terminal system network, to achieve terminal history information cross-system interaction.

To solve the abovementioned technical problem, the present document provides a method for cross-system network information interaction, including:

receiving, by a terminal, a request message for acquiring history information of the terminal transmitted by a network element of a specified system network, after the terminal successfully establishes a connection with the system network or the terminal transmits a connection establishment success message or reestablishment success message which carries a terminal history record information acquirable indication message to the system network; and transmitting, by the terminal, history record information of the terminal staying in all the system networks, other system networks except the system network, or a specified system network, to the specified system network.

Preferably, the abovementioned method further has the following feature:

the system network is a 3GPP network, and the other system networks except the system network include a wireless local area network; or the system network is a wireless local area network, and the other system networks except the system network include a 3GPP network.

Preferably, the abovementioned method further has the following feature: the history record information of the terminal staying in the wireless local area network includes one or more of the following:
  a moment at which the terminal connects to a wireless access point;
  a Basic Service Set Identifier and/or Base Station Identity Code to which the wireless access point belongs;
  a staying time of the terminal in the wireless access point;
  position information at a recording moment of the terminal;
  quality information of a wireless signal at the recording moment of the terminal;
  information of a service performed by the terminal in the wireless local area network.

To solve the abovementioned problem, the present document further provides a method for cross-system network information interaction, including:
  transmitting periodically, by a network element of a target system network, a terminal-dedicated message to a network element of a source system network, or after the network element of the target system network receives a request message for acquiring history record information of a terminal transmitted by the network element of the source system, wherein, the terminal-dedicated message includes history record information of the terminal staying in the target system network.

Preferably, the abovementioned method further has the following feature:
  the target system network includes a 3GPP network, and the network element of the source system network includes a network element of a wireless local area network; or
  the target system network includes a wireless local area network, and the network element of the source system network includes a network element of a 3GPP network.

Preferably, the abovementioned method further has the following feature: the history record information of the terminal staying in the wireless local area network includes one or more of the following:
  a moment at which the terminal connects to a wireless access point;
  a Basic Service Set Identifier and/or Base Station Identity Code to which the wireless access point belongs;
  a staying time of the terminal in the wireless access point;
  position information at a recording moment of the terminal;
  quality information of a wireless signal at the recording moment of the terminal;
  information of a service performed by the terminal in the wireless local area network.

To solve the abovementioned problem, the present document further provides a method for cross-system network information interaction, including:
  receiving periodically, by a network element of a system network, a message of history record information of a terminal, or after the network element of the system network transmits a request message for acquiring the history record information of the terminal; and
  saving, by the network element of the system network, history record information of the terminal in one or more target system networks contained in the message of the history record information of the terminal.

Preferably, the abovementioned method further has the following feature: receiving periodically, by a network element of a system network, history record information of a terminal, includes:
  receiving periodically, by the network element of the system network, a terminal-dedicated message transmitted by a network element of the target system network, wherein, the terminal-dedicated message includes the history record information of the terminal.

Preferably, the abovementioned method further has the following feature:
  the network element of the system network is a network element of a 3GPP network, and the target system network includes a wireless local area network; or
  the network element of the system network is a network element of a wireless local area network, and the target system network includes a 3GPP network.

To solve the abovementioned problem, the present document further provides a method for cross-system network information interaction, including:
  transmitting, by a terminal, a message of history record information of the terminal to an access network discovery and selection function module, wherein, the message of the history record information of the terminal includes history record information of the terminal in one or more system networks.

Preferably, the abovementioned method further has the following feature: one or more system networks include:
  a 3GPP network/or a wireless local area network.

To solve the abovementioned problem, the present document further provides a method for cross-system network information interaction, including:
  receiving, by an access network discovery and selection function module, a message of history record information of a terminal transmitted by the terminal; and
  saving, by the access network discovery and selection function module, the message of the history record information of the terminal in the message of the history record information of the terminal.

To solve the abovementioned problem, the present document further provides a terminal, including:
  a receiving module, configured to receive a request message for acquiring history record information of the terminal transmitted by a network element of a system network, after successfully establishing a connection with the system network or transmitting a connection establishment success message or reestablishment success message which carries terminal history record information acquirable indication information to the system network; and
  a transmitting module, configured to transmit history record information of the terminal staying in all the system networks, other system networks except the system network, or a specified system network, to the network element of the system network.

Preferably, the abovementioned terminal further has the following feature:
  the system network is a 3GPP network, and the other system networks except the system network include a wireless local area network; or
  the system network is a wireless local area network, and the other system networks except the system network include a 3GPP network.

Preferably, the abovementioned terminal further has the following feature:
  the transmitting module is further configured to transmit a message of the history record information of the terminal to an access network discovery and selection function module, wherein, the message of the history record information of the terminal includes history record information of the terminal in one or more system networks.

Preferably, the abovementioned terminal further includes the following feature: the terminal further includes:

a 3GPP network/or a wireless local area network.

Preferably, the abovementioned terminal further has the following feature: the history record information of the terminal staying in the wireless local area network includes one or more of the following:

a moment at which the terminal connects to a wireless access point;

a Basic Service Set Identifier and/or Base Station Identity Code to which the wireless access point belongs;

a staying time of the terminal in the wireless access point;

position information at a recording moment of the terminal;

quality information of a wireless signal at the recording moment of the terminal;

information of a service performed by the terminal in the wireless local area network.

To solve the abovementioned problem, the present document further provides a network element of a system network, wherein, as a network element of a target system network, the network element of the system network includes:

a first receiving module, configured to receive a request message for acquiring history record information of a terminal transmitted by a network element of a source system network; and a first transmitting module, configured to transmit periodically a terminal-dedicated message to the network element of the source system network or after the first receiving module receives the request message, wherein, the terminal-dedicated message includes history record information of the terminal staying in the target system network.

Preferably, the abovementioned network element of the system network further has the following feature:

the target system network includes a 3GPP network, and the network element of the source system network includes a network element of a wireless local area network; or the target system network includes a wireless local area network, and the network element of the source system network includes a network element of a 3GPP network.

Preferably, the abovementioned network element of the system network further has the following feature: as a network element of a source system, the network element of the system network includes:

a second transmitting module, configured to transmit the request message for acquiring the history record information of the terminal;

a second receiving module, configured to receive periodically a message of the history record information of the terminal or after the second transmitting module transmits the request message; and a saving module, configured to save history record information of the terminal in the target system network contained in the message of the history record information of the terminal.

Preferably, the abovementioned network element of the system network further has the following feature:

the second receiving module being configured to receive periodically a message of the history record information of the terminal includes: receiving periodically a terminal-dedicated message transmitted by the network element of the target system network, wherein, the terminal-dedicated message includes the history record information of the terminal.

Preferably, the abovementioned network element of the system network further has the following feature:

the network element of the system network is a network element of a 3GPP network, and the target system network includes a wireless local area network; or the network element of the system network is a network element of a wireless local area network, and the target system network includes a 3GPP network.

Preferably, the abovementioned network element of the system network further has the following feature: the history record information of the terminal staying in the wireless local area network includes one or more of the following:

a moment at which the terminal connects to a wireless access point;

a Basic Service Set Identifier and/or Base Station Identity Code to which the wireless access point belongs;

a staying time of the terminal in the wireless access point;

position information at a recording moment of the terminal;

quality information of a wireless signal at the recording moment of the terminal;

information of a service performed by the terminal in the wireless local area network.

To solve the abovementioned problem, the present document further provides an access network discovery and selection function module, wherein, the access network discovery and selection function module includes:

a receiving module, configured to receive a message of history record information of a terminal transmitted by the terminal; and a saving module, configured to save the message of the history record information of the terminal in the message of the history record information of the terminal.

In conclusion, the embodiments of the present document provide a method for cross-system network information interaction, and a network element of a terminal system network, which may, based on a definition of history record information of the terminal in the WLAN system, realize a cross-system interaction of the history information of the terminal in 3GPP-WLAN system, so that the network element cross-system can acquire promptly a specific situation of the terminal staying in the WLAN system, to provide sufficient decision evidences for realizing the terminal selecting network optimization, cross-system network element device discovery, and resource optimization management and policy optimization between 3GPP system and WLAN system in the case of coexistence of a plurality of access technologies.

PREFERRED EMBODIMENTS

Hereinafter, in conjunction with the accompanying drawings, the embodiments of the present document will be described in detail. It should be illustrated that, under the situation of no conflict, the embodiments and the features of the embodiments in the present application can be freely combined.

The method can achieve an effective transmission and management of history information of a 3GPP-WLAN cross-system terminal, to enable a network element to acquire a specific condition of the terminal historically staying in the WLAN system, to provide a more integrated decision evidence for realizing resource optimization management and policy optimization between 3GPP system and WLAN system in the case of coexistence of a plurality of access technologies, to improve the efficiency for using overall network resource, network performance, and the user's satisfaction.

A definition of history record information of the terminal in the WLAN system at the time of interaction of cross-system is described as follows:

In WLAN, Basic Service Set (BSS for short) is a basic component of a 802.11 network, and a wireless network at least consists of one AP (Access Point) connected to a wired network and a plurality of wireless workstations (STA). A group of computers configured with a same BSS identification may form a group by themselves, and the BSS identification which is a unique identification for identifying the group in the region is so-called BSSID. For Infrastructure mode (including an AP), the ID is the MAC address of the AP.

The history record information of the terminal in the WLAN system includes one or more as follows:

when the terminal is connected to the AP (Access Point) at a certain moment, BSSID (Basic Service Set Identifier) and/or SSID (Base Station Identity Code) to which the AP belongs, and/or other device identification information, such as IP address, device ID number, are recorded;

a staying time of the terminal in the AP;

an absolute moment at which the terminal connects to the AP (a multi-mode terminal may stay in the 3GPP system and the WLAN system concurrently, and in order to analyze the history record information of the terminal more accurately, the absolute moment at which the terminal connects to AP may be recorded), i.e. a time stamp;

position information at a recording moment of the terminal;

quality information of a wireless signal at the recording moment of the terminal, such as quality information of a signal in the WLAN system, quality information of a wireless signal in the 3GPP system;

information of a service performed by the terminal in the WLAN system, such as service property, QoS-related information.

Further, a network side may also make statistics on the history record information of the terminal in the WLAN system at various granularities, such as taking an ESS (Extended Service Set) as the granularity, or taking the whole WLAN system as the granularity.

Figure 1:
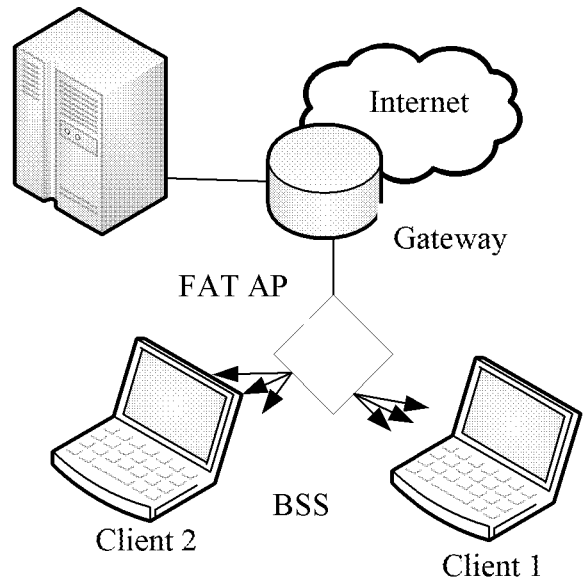
FIG. 1 is an architectural diagram of a WLAN system in the related art.
Figure 2:
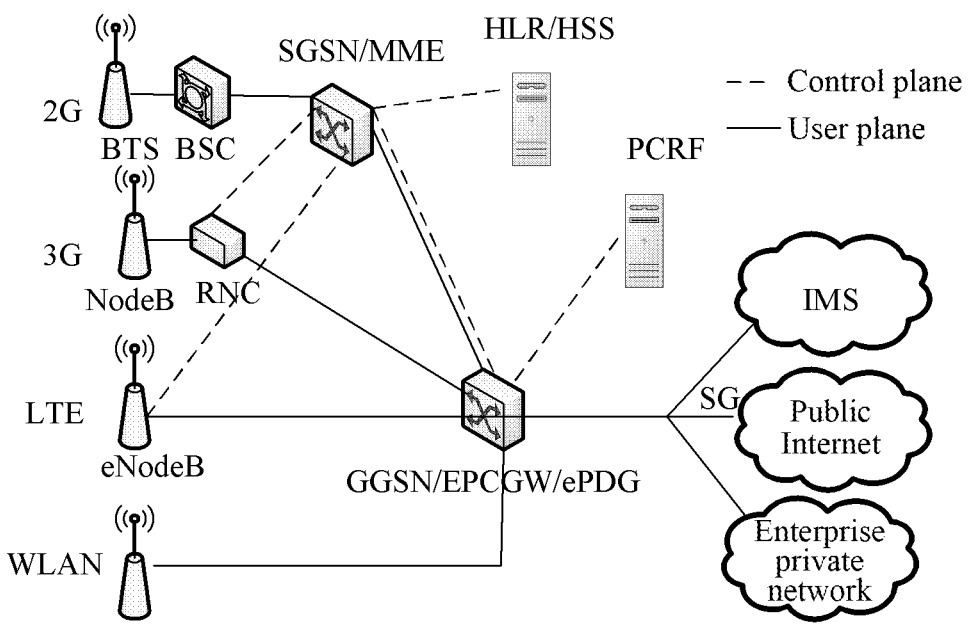
FIG. 2 is an architectural diagram of a 3GPP-WLAN combination system.
Figure 3:
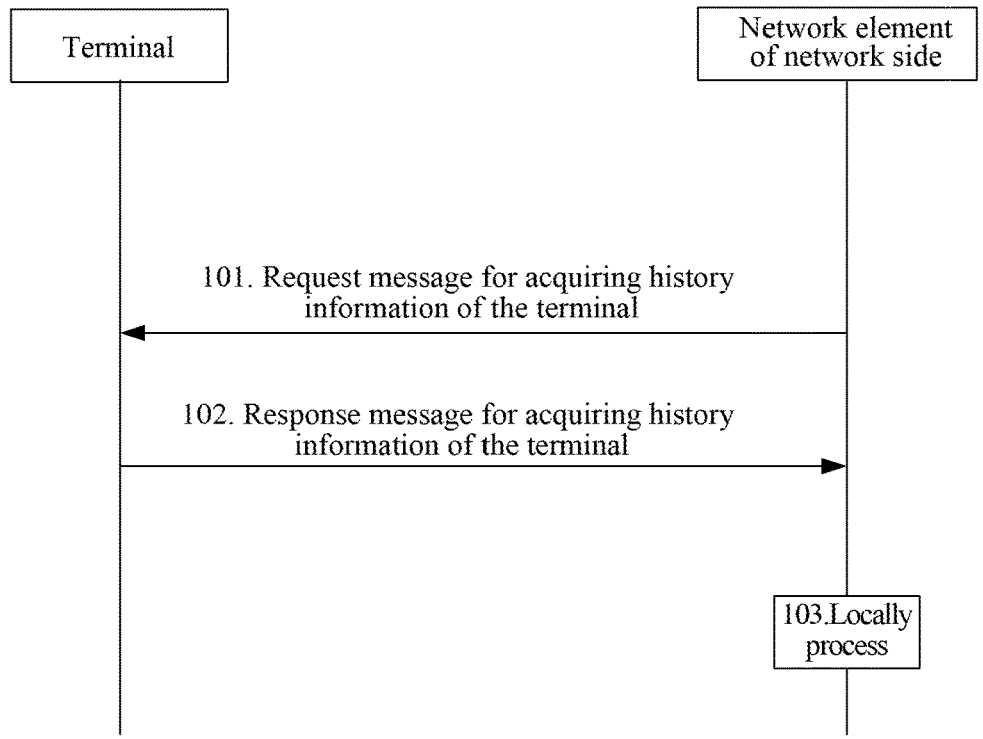
FIG. 3 is a diagram according to a first specific embodiment.

A first embodiment is described as follows in combination with FIG. 3:

in step 101, a connection establishment is initiated by a UE in a 3GPP system, and history record information of the terminal is acquired from a terminal by a network side with a dedicated message after the connection establishment is successful. The message may include a request indication for acquiring the history record information of the terminal, and/or requested WLAN network element information (such as one or more identification symbols of a target network element, such as BSSID, and/or SSID, and/or other device identification information, such as an IP address, device ID number).

In step 102, the UE structures a response message to be transmitted to a network element of a 3GPP system after receiving a request message for acquiring the history information of the terminal, and the message includes the history information of the terminal, and the history information of the terminal includes information of all history cells/APs in which the terminal stayed before reporting, information of a history cell in the 3GPP system refers to the background introduction, which includes, but not limited to, the cell ID and the staying time, and a specific form of the history record information in the WLAN system may refer to the definition of the history record information of the terminal in the WLAN system.

If the request message includes specified WLAN network element information, the terminal reports only the specified history record information in the WLAN system, i.e. the history record information of the terminal staying in one or more APs.

In the embodiments of the present document, other systems may be applied in, besides the 3GPP system and WLAN system.

In step 103, after the 3GPP network element receives the response message, the history record information of the terminal in the WLAN system carried in the response message is saved locally by a 3GPP network element to optimize resource management, and cross-system handover policy between the 3GPP system and WLAN system in future.

Figure 4:
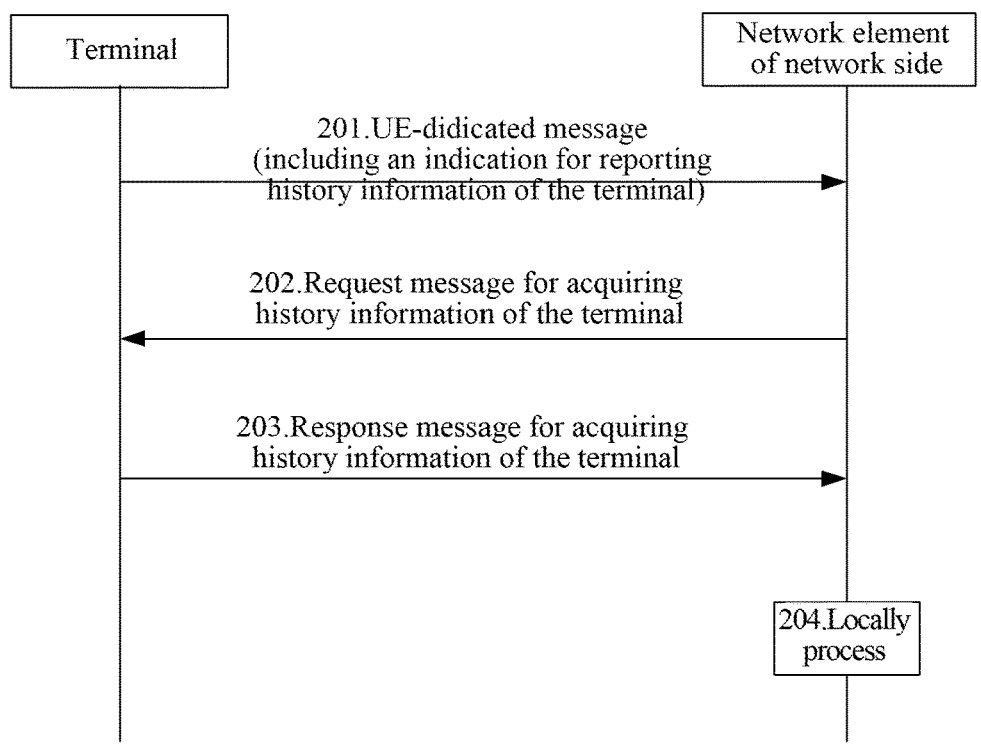
FIG. 4 is a diagram according to a second specific embodiment.

A second embodiment is described as follows in combination with FIG. 4:

in step 201, a connection establishment is initiated by a UE in a 3GPP system, and a terminal history record information acquirable indication message is carried in a connection establishment success message or a reestablishment success message, and the indication message may be a 1-bit indicator.

In step 202, a network side acquires the history information of the terminal with a dedicated message after receiving the indication message. The message may include a type of information requested to acquire, such as the history record information of the terminal, and the message may also include specific WLAN network element information (such as one or more identification symbols, such as BSSID, and/or SSID, and/or other device identification information, such as an IP address, device ID number).

In step 203, the UE structures a response message to be transmitted to a network element of a 3GPP system after receiving the request message, and the message includes the history information of the terminal, and the history information of the terminal includes information of all history cells/APs in which the terminal stayed before reporting, information of the history cell in the 3GPP system refers to the background introduction, which includes, but not limited to, the cell ID and the staying time; and a specific form of the history record information in the WLAN system may refer to the definition of the history record information of the terminal in the WLAN system.

If the request message includes specified WLAN network element information, the terminal reports only the specified history record information in the WLAN system, i.e. the history record information of the terminal staying in one or more APs.

In step 204, the history record information of the terminal in the WLAN system carried in the response message is saved locally by a 3GPP network element after the 3GPP network element receives the response message, to optimize resource management, and cross-system handover policy between the 3GPP system and WLAN system in future.

Figure 5:
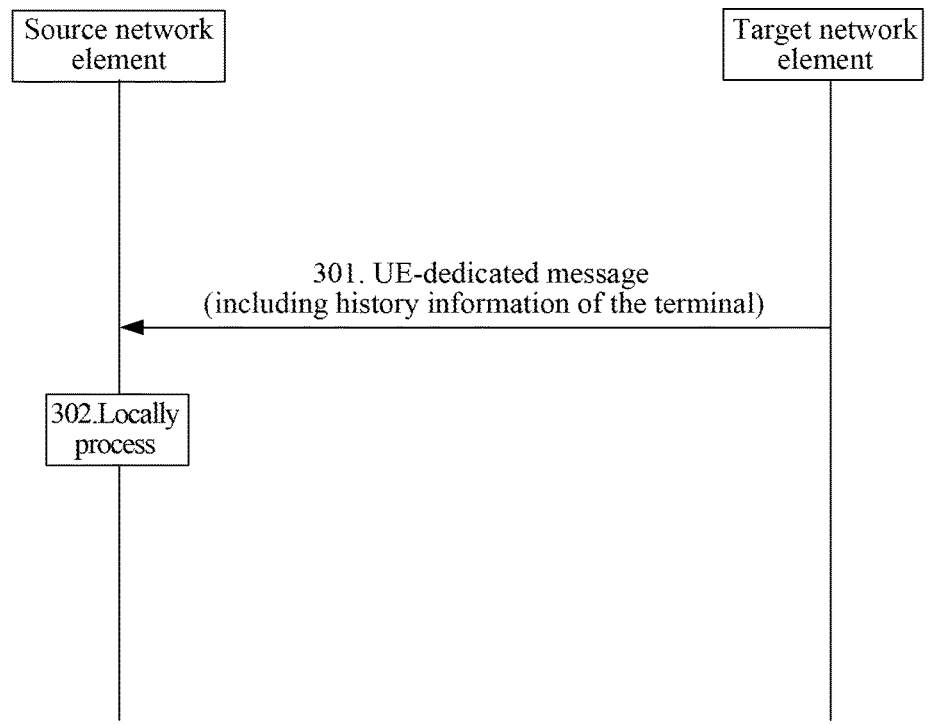
FIG. 5 is a diagram according to a third specific embodiment.

A third embodiment is described as follows in combination with FIG. 5:

In step 301, a WLAN target network element transmits a UE-dedicated message to a 3GPP source network element through a direct interface, and the message includes the history record information of the terminal in the WLAN system, and unique identification information of the terminal, such as MAC (Message Access Control) address information of the terminal, IMSI (International Mobile Subscriber Identification Number) information of the terminal, or unique identification information of the terminal on the interface.

The WLAN system feeds back the history record information of one or more APs in which the terminal stayed to the 3GPP source network element, a specific form may refer to the definition of the history record information of the terminal in the WLAN system. The UE-dedicated message may be a handover-related message, but not limited to the handover-related message.

In step 302, after receiving the message, a 3GPP network element may save and process locally the history record information of the terminal in the WLAN system carried in the message, to optimize resource management and cross-system handover policy between the 3GPP system and the WLAN system in future.

Figure 6:
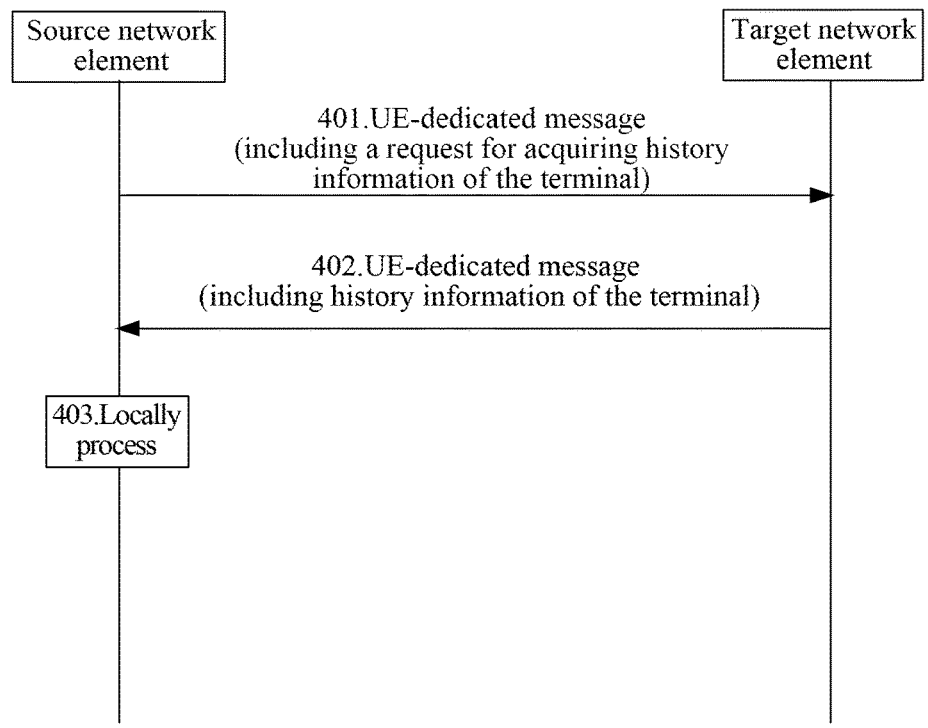
FIG. 6 is a diagram according to a fourth specific embodiment.

A fourth embodiment is described as follows in combination with FIG. 6:

In step 401, a 3GPP source network element transmits a request to a WLAN target network element with a UE-dedicated message, and the message includes a request indication for requesting to acquire history record information of the terminal.

In step 402, the WLAN target network element transmits a response message to the 3GPP resource network element with a UE-dedicated message, to feed back the history information of one or more APs in which the terminal stayed to the 3GPP source network element, a specific form may refer to the definition of the history record information of the terminal in the WLAN system.

The UE-dedicated information may be a handover-related message, such as a handover request message and a handover preparing response message, but not limited to the handover-related message.

In step 403, after receiving the message, a 3GPP source network element may save locally the history record information of the terminal in the WLAN system carried in the message, to optimize resource management and cross-system handover policy between the 3GPP system and the WLAN system in future.

Figure 7:
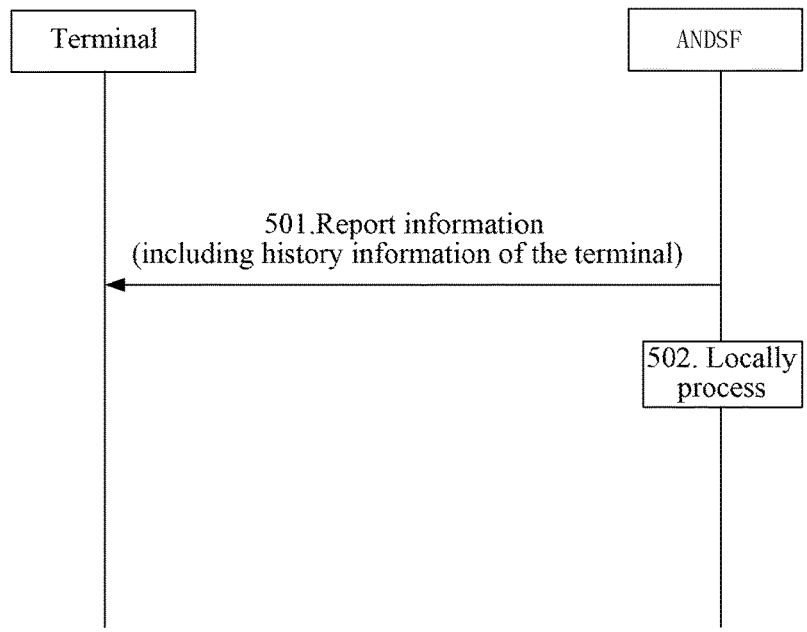
FIG. 7 is a diagram according to a fifth embodiment of the present document.

A fifth embodiment is described as follows in combination with FIG. 7:

In step 501, the terminal transmits a message of history record information of a terminal to an ANDSF through an S14 interface, and the message includes the history record information of the terminal in the 3GPP system and/or the WLAN system. A specific form of the history record information of the terminal in the WLAN system may refer to a definition of the history record information of the terminal in the WLAN system.

Periodically or according to a trigger of a specific event, the terminal may transmit the message of the history record information to the ANDSF.

In step 502, after receiving the message, the ANDSF may save locally the history record information of the terminal carried in the message, for the 3GPP system and WLAN system discovery, and network selection policy rule optimization in future.

Further, in the third embodiment and fourth embodiment, the message between the 3GPP source network element and the WLAN target network element may be interacted through a direct interface between devices, may also be forwarded through a core network.

Further, the third embodiment and fourth embodiment may be realized inversely, that is, the source network element is the WLAN source network element, and the target network element is the 3GPP target network element, of course, they may be network elements of other system network as well.

Further, in the first embodiment, second embodiment, third embodiment, and fourth embodiment, 3GPP network element may be an eNB in the LTE system, an RNC (Radio Network Controller) in the UMTS system, a BSC (Base Station Controller) in the GSM system, or an independent device unit as well. The WLAN network element may be an AP, an AC, or an independent device unit.

Figure 8:
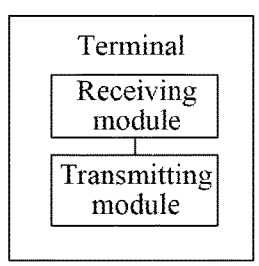
FIG. 8 is a diagram of a terminal according to an embodiment of the present document.

FIG. 8 is a diagram of a terminal according to an embodiment of the present document, as shown in FIG. 8, the terminal of the present embodiment may include:

a receiving module, used to receive a request message for acquiring history record information of the terminal, transmitted by a network element of a system network, after successfully establishing a connection with the system network or transmitting a connection establishment success message or reestablishment success message which carries terminal history record information acquirable indication information to the system network; and a transmitting module, used to transmit history record information of all the system networks, other system networks except the system network, or a specified system network, in which the terminal stayed in, to the network element of the system network.

Wherein, the system network is a 3GPP network, and the other system networks except the system network include a wireless local area network; or the system network is a wireless local area network, and the other system networks except the system network include a 3GPP network.

In a preferred embodiment, the transmitting module may further be used to transmit a message of the history record information of the terminal to an access network discovery and selection function module, and the message of the history record information of the terminal includes the history record information of the terminal in one or more system networks.

Wherein, the one or more system networks include: a 3GPP network/or a wireless local area network.

Figure 9:
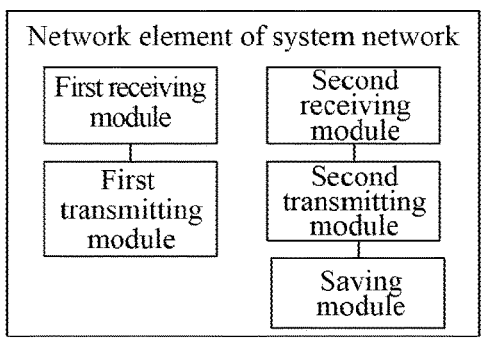
FIG. 9 is a diagram of a network element of a system network according to an embodiment of the present document.

FIG. 9 is a diagram of network element of the system network according to an embodiment of the present document, as shown in FIG. 9, if the network element of the system network of the embodiment is used as a network element of a target system network, it may include:

a first receiving module, used to receive a request message for acquiring history record information of a terminal transmitted by a network element of a source system network; and a first transmitting module, used to transmit periodically a terminal-dedicated message to the network element of the source system network or after the first receiving module receives the request message, wherein, the terminal-dedicated message includes history record information of the terminal staying in the target system network.

If the network element of the system network in the embodiment is used as a network element of a source system network, it may include:

a second transmitting module, used to transmit the request message for acquiring the history record information of the terminal;

a second receiving module, used to receive periodically a message of the history record information of the terminal or after the second transmitting module transmits the request message; and a saving module, used to save history record information of the terminal in the target system network contained in the message of the history record information of the terminal.

Wherein, the second receiving module receiving periodically the message of the history record information of the terminal may include: receiving periodically a terminal-dedicated message transmitted by the network element of the target system network, wherein, the terminal-dedicated message includes the history record information of the terminal.

Figure 10:
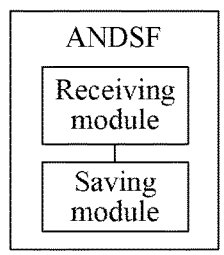
FIG. 10 is a diagram of an ANDSF according to an embodiment of the present document.

FIG. 10 is a diagram of an ANDSF according to an embodiment of the present document, as shown in FIG. 10, the ANDSF of the present embodiment may include:

a receiving module, used to receive a message of history record information of a terminal transmitted by the terminal; and a saving module, used to save the message of the history record information of the terminal in the message of the history record information of the terminal.

Those ordinarily skilled in the art can understand that all or some of steps of the abovementioned method may be completed by the programs instructing the relevant hardware, and the programs may be stored in a computer-readable storage medium, such as read only memory, magnetic or optical disk or the like. Alternatively, all or some of the steps of the abovementioned embodiments may also be implemented by using one or more integrated circuits. Accordingly, each module/unit in the abovementioned embodiments may be realized in a form of hardware, or in a form of software function module. The present document is not limit to any specific form of the combination of the hardware and software.

The above description is only the preferred embodiments of the present document. Certainly, the present document can have a variety of other embodiments. Those skilled in the art can make the corresponding modifications and variations according to the present document without departing from the rule and essence of the present document. And all of these modifications or the variations should be embodied in the protection scope of the appended claims of the present document.

INDUSTRIAL APPLICABILITY

The embodiments of the present document provide a method for cross-system network information interaction, and a network element of a terminal system network, which may, based on a definition of history record information of the terminal in the WLAN system, realize an interaction of the history information of the terminal in 3GPP-WLAN system, so that the cross-system network element can acquire timely a specific situation of the terminal staying historically in the WLAN system, to provide sufficient decision evidences for realizing the terminal selection network optimization, cross-system network element device discovery, and resource optimization management and policy optimization between 3GPP system and WLAN system.

What is claimed is:

1. A method for cross-system network information interaction, comprising:

performing, on a terminal, handover from a first system network to a second system network;

receiving, by the terminal, a request message for acquiring history record information of the terminal transmitted by a network element of the second system network, after the terminal successfully establishes a connection with the second system network or the terminal transmits to the second system network an indication message indicates the history record information of the terminal is acquirable; and transmitting, by the terminal, the history record information of the terminal in the first system network, to the second system network;

wherein the first system network comprises a 3GPP network, and the second system network comprises a wireless local area network; or the first system network comprises a wireless local area network, and the second system network comprises a 3GPP network;

wherein the method further comprises:

receiving periodically, by a network element of the second system network, a terminal-dedicated message transmitted by a network element of the first system network, wherein, the terminal-dedicated message comprises the history record information of the terminal in the first system network;

wherein the history record information of the terminal in the wireless local area network comprises:

a moment at which the terminal connects to a wireless access point;

a Basic Service Set Identifier and Base Station Identity Code to which the wireless access point belongs;

a staying time of the terminal in the wireless access point;

position information at a recording moment of the terminal;

quality information of a wireless signal at the recording moment of the terminal;

information of a service performed by the terminal in the wireless local area network.

2. The method according to claim 1, wherein, the indication message is comprised in a message which is transmitted from the terminal to the second system network and indicates connection between the terminal and second system network is established successfully.

3. A method for cross-system network information interaction, comprising:

performing, on a terminal, handover from a first system network to a second system network;

transmitting, by a network element of the first system network, a terminal-dedicated message to a network element of the second system network after the network element of the first system network receives a request message for acquiring history record information of the terminal transmitted by the network element of the second system network, wherein, the terminal-dedicated message comprises history record information of the terminal in the first system network;

wherein the first system network comprises a 3GPP network, and the second system network comprises a wireless local area network; or the first system network comprises a wireless local area network, and the second system network comprises a 3GPP network;

wherein the history record information of the terminal in the wireless local area network comprises:
a moment at which the terminal connects to a wireless access point;
a Basic Service Set Identifier and Base Station Identity Code to which the wireless access point belongs;
a staying time of the terminal in the wireless access point;
position information at a recording moment of the terminal;
quality information of a wireless signal at the recording moment of the terminal;
information of a service performed by the terminal in the wireless local area network.

4. The method according to claim 3, wherein, the history record information of the terminal in the wireless local area network comprises one or more of the following:
a moment at which the terminal connects to a wireless access point;
a Basic Service Set Identifier and/or Base Station Identity Code to which the wireless access point belongs;
a staying time of the terminal in the wireless access point;
position information at a recording moment of the terminal;
quality information of a wireless signal at the recording moment of the terminal;
information of a service performed by the terminal in the wireless local area network.

5. A method for cross-system network information interaction, comprising:
performing, on a terminal, handover from a first system network to a second system network;
receiving periodically, by a network element of the second system network, history record information of the terminal in the first system network; and
saving, by the network element of the second system network, history record information of the terminal in the first system network;
wherein the first system network comprises a 3GPP network, and the second system network comprises a wireless local area network; or the first system network comprises a wireless local area network, and the second system network comprises a 3GPP network;
wherein, the receiving periodically, by a network element of the second system network, history record information of the terminal in the first system network, comprises:
receiving periodically, by the network element of the second system network, a terminal-dedicated message transmitted by a network element of the first system network, wherein, the terminal-dedicated message comprises the history record information of the terminal in the first system network;
wherein the history record information of the terminal in the wireless local area network comprises:
a moment at which the terminal connects to a wireless access point;
a Basic Service Set Identifier and Base Station Identity Code to which the wireless access point belongs;
a staying time of the terminal in the wireless access point;
position information at a recording moment of the terminal;
quality information of a wireless signal at the recording moment of the terminal;
information of a service performed by the terminal in the wireless local area network.

6. A terminal, wherein handover from a first system network to a second system network is performed on the terminal, and the terminal comprises:
a receiving module, configured to receive a request message for acquiring history record information of the terminal transmitted by a network element of the second system network, after successfully establishing a connection with the second system network or transmitting to the second system network an indication message which indicates that the history record information of the terminal is acquirable;
a transmitting module, configured to transmit the history record information of the terminal in first system network, to the second system network;
wherein the first system network comprises a 3GPP network, and the second system network comprises a wireless local area network; or the first system network comprises a wireless local area network, and the second system network comprises a 3GPP network;
wherein the history record information of the terminal in the wireless local area network comprises:
a moment at which the terminal connects to a wireless access point a Basic Service Set Identifier and Base Station Identity Code to which the wireless access point belongs;
a staying time of the terminal in the wireless access point;
position information at a recording moment of the terminal;
quality information of a wireless signal at the recording moment of the terminal;
information of a service performed by the terminal in the wireless local area network.

7. The terminal according to claim 6, wherein, the indication message is carried with a message which is transmitted from the terminal to the second system network and indicates connection between the terminal and second system network is established successfully.

8. The terminal of claim 6, wherein,
the transmitting module is further configured to transmit a message of the history record information of the terminal to an access network discovery and selection function module, wherein, the message of the history record information of the terminal comprises history record information of the terminal in the first system network.

9. A network element of a first system network, wherein handover from the first system network to a second system network is performed on a terminal, and the network element of the first system network comprises:
a first receiving module, configured to receive a request message for acquiring history record information of the terminal transmitted by a network element of the second system network; and
a first transmitting module, configured to transmit a terminal-dedicated message to the network element of the second system network after the first receiving module receives the request message, wherein, the terminal-dedicated message comprises history record information of the terminal in the first system network;

wherein the first system network comprises a 3GPP network, and the second system network comprises a wireless local area network; or the first system network comprises a wireless local area network, and the second system network comprises a 3GPP network;

wherein the history record information of the terminal in the wireless local area network comprises:

a moment at which the terminal connects to a wireless access point;

a Basic Service Set Identifier and Base Station Identity Code to which the wireless access point belongs;

a staying time of the terminal in the wireless access point;

position information at a recording moment of the terminal;

quality information of a wireless signal at the recording moment of the terminal;

information of a service performed by the terminal in the wireless local area network.

10. The network element of the system network according to claim 9, wherein, the network element of the second system network comprises:

a second transmitting module, configured to transmit the request message for acquiring the history record information of the terminal;

a second receiving module, configured to receive periodically a message of the history record information of the terminal or receive a message of the history record information of the terminal after the second transmitting module transmits the request message; and a saving module, configured to save history record information of the terminal in the first system network.

11. The network element of the system network according to claim 10, wherein, the second receiving module being configured to receive periodically a message of the history record information of the terminal comprises: receiving periodically a terminal-dedicated message transmitted by the network element of the target system network, wherein, the terminal-dedicated message comprises the history record information of the terminal in the first system network.

* * * * *